(12) United States Patent
Kightlinger et al.

(10) Patent No.: US 12,438,347 B2
(45) Date of Patent: Oct. 7, 2025

(54) METHOD OF CUTTING SHIELDING CONDUCTOR OF A HIGH VOLTAGE CABLE AND APPARATUS TO BE USED THEREFORE

(71) Applicant: Aptiv Technologies AG, Schaffhausen (CH)

(72) Inventors: John Kightlinger, Canfield, OH (US); Shawn Alan Chernushin, Columbiana, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 552 days.

(21) Appl. No.: 17/883,831

(22) Filed: Aug. 9, 2022

(65) Prior Publication Data
US 2023/0170675 A1 Jun. 1, 2023

Related U.S. Application Data

(60) Provisional application No. 63/283,952, filed on Nov. 29, 2021.

(51) Int. Cl.
*H02G 1/12* (2006.01)
(52) U.S. Cl.
CPC .................. *H02G 1/1256* (2013.01)
(58) Field of Classification Search
CPC .. H02G 1/1256; H02G 1/1297; H02G 1/1265; H02G 1/005; B21F 11/00
See application file for complete search history.

(56) References Cited

U.S. PATENT DOCUMENTS

| 3,721,138 A | 3/1973 | Kamimura et al. |
| 5,138,910 A * | 8/1992 | Ishikawa ............... H02G 1/1256 29/33 M |

(Continued)

FOREIGN PATENT DOCUMENTS

| CN | 104682168 A | 6/2015 |
| CN | 207165264 U * | 3/2018 |

(Continued)

OTHER PUBLICATIONS

"Extended European Search Report Received mailed on Apr. 12, 2023", 11 Pages.

*Primary Examiner* — Jeffrey T Carley
*Assistant Examiner* — Jose K Abraham
(74) *Attorney, Agent, or Firm* — Billion & Armitage

(57) ABSTRACT

An apparatus for cutting a previously flared shield conductor of a shielded electrical cable includes a two-piece clamping die having an aperture in which the shielded electrical cable is secured and a cutting surface. The clamping die is opened and closed around the shielded electrical cable. The apparatus further includes a cutting tube configured to be pressed against the cutting surface while the flared shield conductor is between the cutting tube and the cutting surface, thereby cutting a portion of a free end of the flared shield conductor. Alternatively, the apparatus may include a die comprising a cutting surface and an aperture in which the end of the shielded electrical cable is received. The cutting tube has two parts that are closed about the shielded electrical cable and pressed against the cutting surface while the flared shield conductor is disposed between the cutting tube and the cutting surface.

19 Claims, 7 Drawing Sheets

(56) References Cited

U.S. PATENT DOCUMENTS

| | | | | |
|---|---|---|---|---|
| 6,243,947 B1 * | 6/2001 | Fujita | ............... | H02G 1/1256 29/33 F |
| 6,330,839 B1 * | 12/2001 | Amrein | ............... | H02G 1/1273 81/9.51 |
| 6,363,604 B1 * | 4/2002 | Sakuma | ............... | H02G 1/1256 81/9.51 |
| 6,536,103 B1 * | 3/2003 | Holland | ............... | H01R 43/28 81/9.41 |
| 6,659,140 B2 * | 12/2003 | Yamakawa | ............... | H01R 43/28 140/71 R |
| 6,776,196 B2 * | 8/2004 | Yamakawa | ............... | H01R 43/05 140/71 R |
| 6,883,232 B2 * | 4/2005 | Sato | ............... | H02G 15/068 29/748 |
| 8,191,250 B2 * | 6/2012 | Kawase | ............... | H01R 9/0509 174/75 C |
| 8,291,578 B2 | 10/2012 | Matsuoka | | |
| 9,906,005 B2 | 2/2018 | Baldauf | | |
| 2015/0288153 A1 * | 10/2015 | Baldauf | ............... | H02G 1/1256 81/9.42 |
| 2019/0318850 A1 * | 10/2019 | Ogino | ............... | H01R 43/28 |
| 2020/0076173 A1 * | 3/2020 | Houser | ............... | H01R 43/28 |

FOREIGN PATENT DOCUMENTS

| | | | | |
|---|---|---|---|---|
| EP | 1054494 A2 | 11/2000 | | |
| EP | 3163697 B1 | 9/2020 | | |
| GB | 678181 A * | 8/1952 | | |
| GB | 2099237 A | 12/1982 | | |
| JP | 5725113 A | 2/1982 | | |
| JP | 5725113 B2 * | 5/2015 | | |
| WO | WO-2020016056 A1 * | 1/2020 | ............. | H01R 43/28 |

* cited by examiner

METHOD OF CUTTING SHIELDING CONDUCTOR OF A HIGH VOLTAGE CABLE AND APPARATUS TO BE USED THEREFORE

CROSS-REFERENCE TO RELATED APPLICATION

This application claims benefit of priority to U.S. Application No. 63/283,952 filed on Nov. 29, 2021, the entire disclosure of which is hereby incorporated by reference.

TECHNICAL FIELD

This disclosure is directed to a method of cutting or trimming a shielding conductor of a high voltage electrical cable and an apparatus for cutting or trimming a shielding conductor of a high voltage electrical cable.

BACKGROUND

High voltage electrical cables have a metallic braided shield conductor that surrounds the a metallic central conductor to provide protection against electromagnetic interference from or with the high voltage electrical cable. The shield conductor is located underneath the outer insulation layer of the high voltage electrical cable. In order to process and terminate the high voltage electrical cable, it is necessary to cut or trim the shield conductor to a specified length that is determined by the design of the connector to be attached to the high voltage electrical cable. Currently, a metallic tube is used to squeeze the shield conductor against a metallic ring that is then rotated with force to cut the shield conductor to the desired length for subsequent processing. The high voltage electrical cable is first inserted through the cutting surface, the shield conductor is then manually flared by a human operator, the cutting tube is manually inserted underneath the flared shield, and the shield conductor is pressed against the cutting surface while being rotated.

Some of the problems observed with the prior art methods and apparatus illustrated in FIGS. 1-5 include operator induced variation to the process, the process being reliant upon a person manually flaring the shield conductor prior to the cutting cycle, incomplete cutting of the shield conductor, e.g., long strands of the shield conductor remaining, and bunching up of the shield conductor when the cutting tube moves underneath the flared portion of the shield conductor. Due to the design of the current apparatus, the high voltage electrical cable must be inserted through the cutting surface before the shield conductor can be flared, which also presents an ergonomic challenge because the operator.

SUMMARY

According to one or more aspects of the present disclosure, an apparatus configured to cut a shield conductor of an electrical cable that is flared outwardly from the electrical cable includes a two-piece clamping die an aperture extending therethrough in which the electrical cable is secured and a cutting surface. The two pieces of the clamping die are configured to be opened and closed around the electrical cable. The apparatus further includes a cutting tube configured to receive an end of the electrical cable and to press against the cutting surface while the flared shield conductor is disposed between the cutting tube and the cutting surface, thereby cutting a portion of a free end of the flared shield conductor.

In one or more embodiments of the apparatus according to the previous paragraph, the apparatus further includes a die clamping mechanism configured to move at least one of the two pieces of the clamping die relative to the other of the two pieces of the clamping die in a direction perpendicular to a longitudinal axis of the electrical cable.

In one or more embodiments of the apparatus according to any one of the previous paragraphs, the apparatus further includes a die translation mechanism configured to move the clamping die in a direction parallel to a longitudinal axis of the electrical cable relative to the cutting tube.

In one or more embodiments of the apparatus according to any one of the previous paragraphs, the apparatus further includes a cutting tube rotation mechanism configured to rotate the cutting tube around a longitudinal axis of the electrical cable.

In one or more embodiments of the apparatus according to any one of the previous paragraphs, the apparatus further includes a cable stop configured to contact the end of the electrical cable, thereby positioning the flared shield conductor relative to the cutting tube and cutting surface.

In one or more embodiments of the apparatus according to any one of the previous paragraphs, the cutting surface defines an annular shape.

In one or more embodiments of the apparatus according to any one of the previous paragraphs, the cutting tube further comprises a frustoconical guiding tool configured to position the flared shield conductor between with the cutting surface and the cutting tube.

According to one or more aspects of the present disclosure, a method of cutting a shield conductor of a high voltage electrical cable includes flaring a free end of the shield conductor outwardly from the high voltage electrical cable, placing the electrical cable in an aperture of a two-piece clamping die, and moving at least one of the two pieces of the clamping die toward the other of the two pieces of the clamping die in a direction perpendicular to a longitudinal axis of the electrical cable, thereby clamping the electrical cable within the aperture of the clamping die. The method further includes disposing an end of the electrical cable within a cutting tube, moving the clamping die in a direction parallel to a longitudinal axis of the electrical cable towards the cutting tube, and pressing the cutting tube against a cutting surface of the clamping die with the flared shield conductor disposed between the cutting tube and the cutting surface. The method additionally includes rotating the cutting tube relative to the cutting surface of the clamping die and cutting through the flared shield conductor with an edge of the cutting tube as it is pressed against the cutting surface.

In one or more embodiments of the method according to the previous paragraph, the step of flaring the free end of the shield conductor outwardly from the high voltage electrical cable is performed prior to all of the other steps of the method.

In one or more embodiments of the method according to the any one of the previous paragraphs, the method further includes retracting the clamping die from being in contact with the cutting tube, moving the at least one of the two pieces of the clamping die away from the other of the two pieces of the clamping die in a direction perpendicular to a longitudinal axis of the electrical cable, thereby releasing the electrical cable from the aperture of the clamping die, and removing the high voltage electrical cable from the clamping die.

In one or more embodiments of the method according to the any one of the previous paragraphs, the steps of moving at least one of the two pieces of the clamping die toward the other of the two pieces of the clamping die in a direction perpendicular to a longitudinal axis of the electrical cable and moving the at least one of the two pieces of the clamping die away from the other of the two pieces of the clamping die in a direction perpendicular to a longitudinal axis of the electrical cable are performed using a linear actuator having a lever configured to rotate about a pivot and a connecting rod attached between the lever and the at least one of the two pieces of the clamping die.

In one or more embodiments of the method according to the any one of the previous paragraphs, the steps of moving the clamping die in a direction parallel to a longitudinal axis of the electrical cable towards the cutting tube and moving the at least one of the two pieces of the clamping die away from the other of the two pieces of the clamping die in a direction perpendicular to a longitudinal axis of the electrical cable are performed using a linear actuator having a lever configured to rotate about a pivot and a connecting rod attached between the lever and the at least one of the two pieces of the clamping die.

In one or more embodiments of the method according to the any one of the previous paragraphs, the linear actuator further comprises a guide rail.

In one or more embodiments of the method according to the any one of the previous paragraphs, the step of rotating the cutting tube relative to the cutting surface of the clamping die is performed using a lever attached to the cutting tube.

In one or more embodiments of the method according to the any one of the previous paragraphs, the method further includes removing a portion of an outer insulating jacket of the high voltage electrical cable to expose the shield conductor.

According to one or more aspects of the present disclosure, an apparatus configured to cut a shield conductor of an electrical cable that is flared outwardly from the electrical cable includes a die comprising a cutting surface and an aperture extending therethrough, wherein the aperture is configured to receive an end of the electrical cable and a cutting tube having two parts that are configured to be closed about the electrical cable and pressed against the cutting surface while the flared shield conductor is disposed between the cutting tube and the cutting surface, thereby cutting a portion of a free end of the flared shield conductor.

In one or more embodiments of the apparatus according to the previous paragraph, the apparatus further includes a cable stop configured to contact the end of the electrical cable, thereby positioning the flared shield conductor relative to the cutting tube and cutting surface.

In one or more embodiments of the apparatus according to any one of the previous paragraphs, the apparatus further includes a frustoconical guiding tool surrounding the aperture configured to guide the flared shield conductor into contact with the cutting surface.

In one or more embodiments of the apparatus according to any one of the previous paragraphs, the two parts of the cutting tube each have a semi-cylindrical shape and are joined along a longitudinal edge by a hinge feature, thereby forming a cylindrical cutting tube when closed about the electrical cable.

In one or more embodiments of the apparatus according to any one of the previous paragraphs, a diameter of the aperture is greater than a diameter of the flared shield conductor.

DESCRIPTION OF THE DRAWINGS

The present invention will now be described, by way of example with reference to the accompanying drawings, in which.

Similar elements in the various examples illustrated herein may share the last two digits of the their reference numbers.

DETAILED DESCRIPTION

Figure 1:
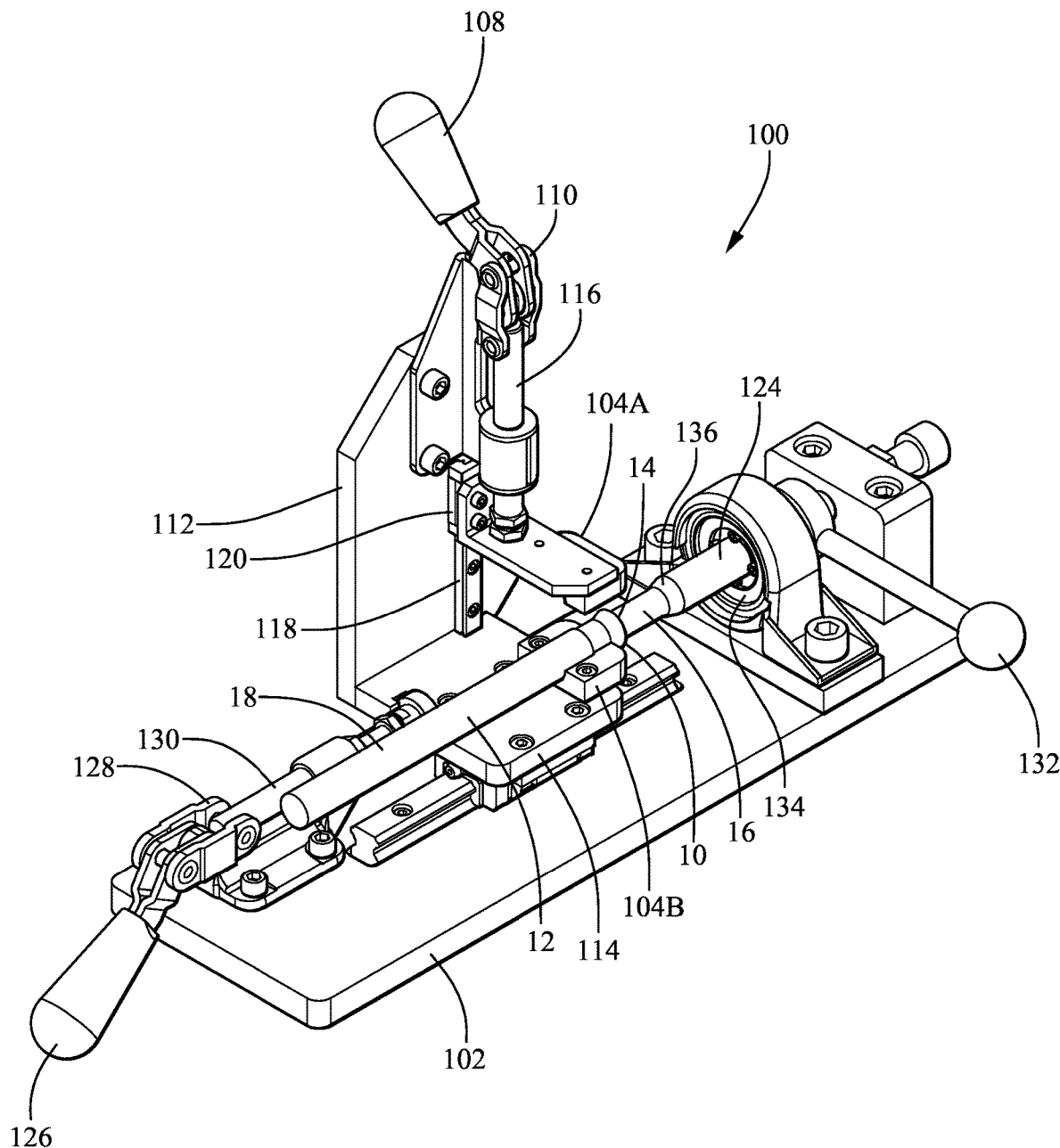
FIG. 1 shows a perspective view of an apparatus for a cutting shield conductor of a shielded electrical cable in an open condition according to an embodiment.

The problem of operator-caused variation and the difficulty of flaring a shield conductor after it is secured within a shield cutting apparatus when trimming it to the desired length is solved by redesigning the apparatus and method to allow the shield conductor to be flared prior to inserting the high voltage electrical cable in the shield cutting apparatus. This innovative design also addresses some of the ergonomic shortcomings of prior shield cutting apparatus.

A non-limiting example of an apparatus 100 for cutting a shield conductor 10 of a shielded electrical cable 12 that has been previously flared outwardly from the shielded electrical cable 12 is shown in FIGS. 1-6.

The apparatus 100 is built up from a base plate 102 to which the other components of the apparatus 100 are attached. The apparatus 100 contains a two-piece clamping die 104 having an aperture 106 extending therethrough in which the shielded electrical cable 12 is secured. The two pieces or halves of the clamping die 104 are opened and closed around the shielded electrical cable 12 by a die clamping mechanism configured to move one or both the halves of the clamping die 104 relative to the other in a direction that is perpendicular to a longitudinal axis X of the shielded electrical cable 12, hereafter referred to as the lateral direction Y. In the illustrated example, the die clamping mechanism includes a first lever 108 connected by a first pivot 110 to a side upright plate 112 attached to a sliding plate 114. The first lever 108 is also attached to a first half 104A of the clamping die 104 by a first connecting rod 116. The first lever 108 is configured to laterally move first half 104A of the clamping die 104 relative to the second half 104B of the clamping die 104 as shown by comparing FIGS. 1 and 2. The die clamping mechanism also includes a T-shaped first guide rail 118 and corresponding first guide clamp 120 to ensure that the first half 104A of the clamping die 104 moves in the desired lateral direction Y as the first lever 108 is activated.

Figure 2:
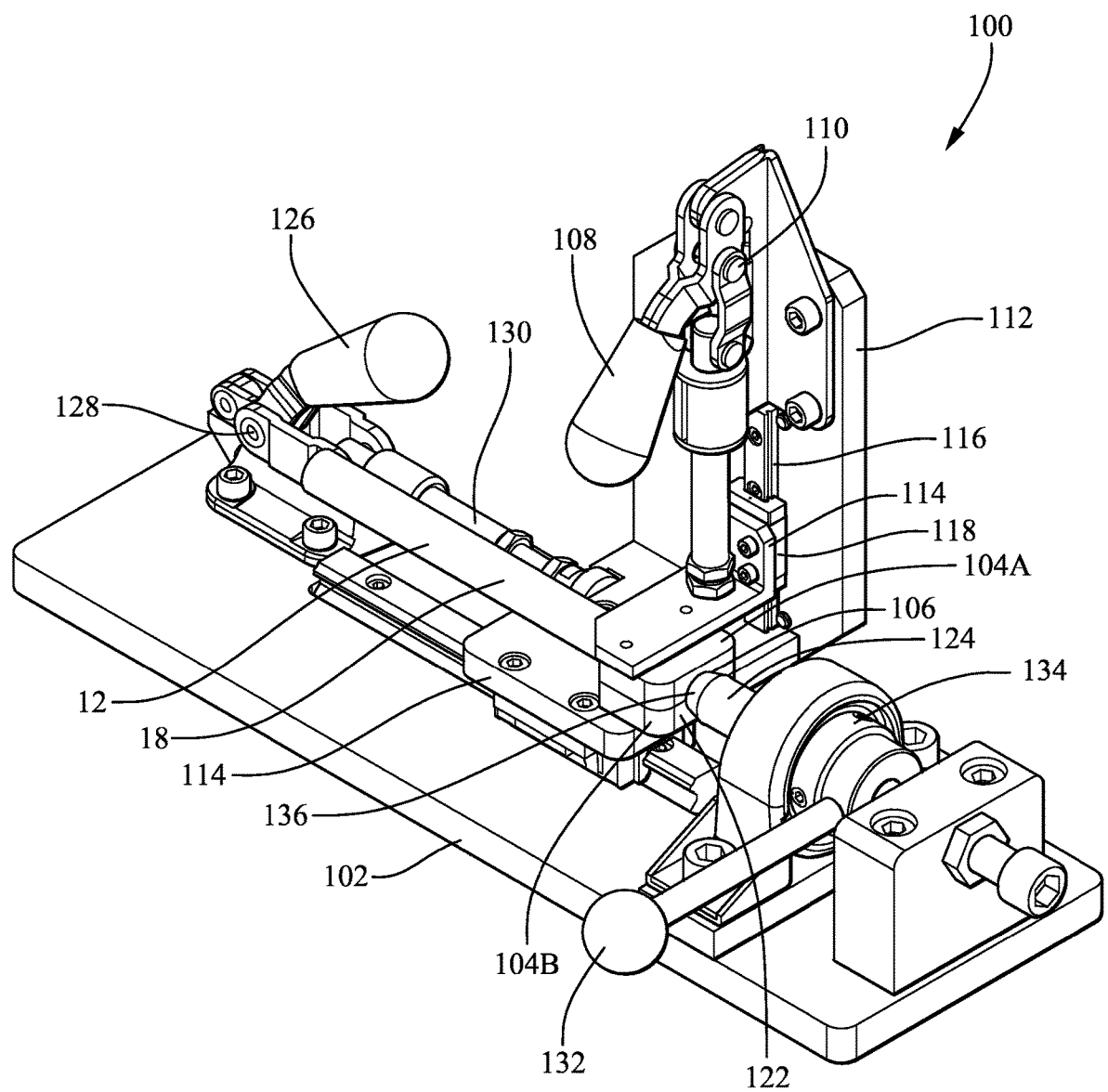
FIG. 2 shows a perspective view of the apparatus of FIG. 1 in a closed condition according to an embodiment.
Figure 3:
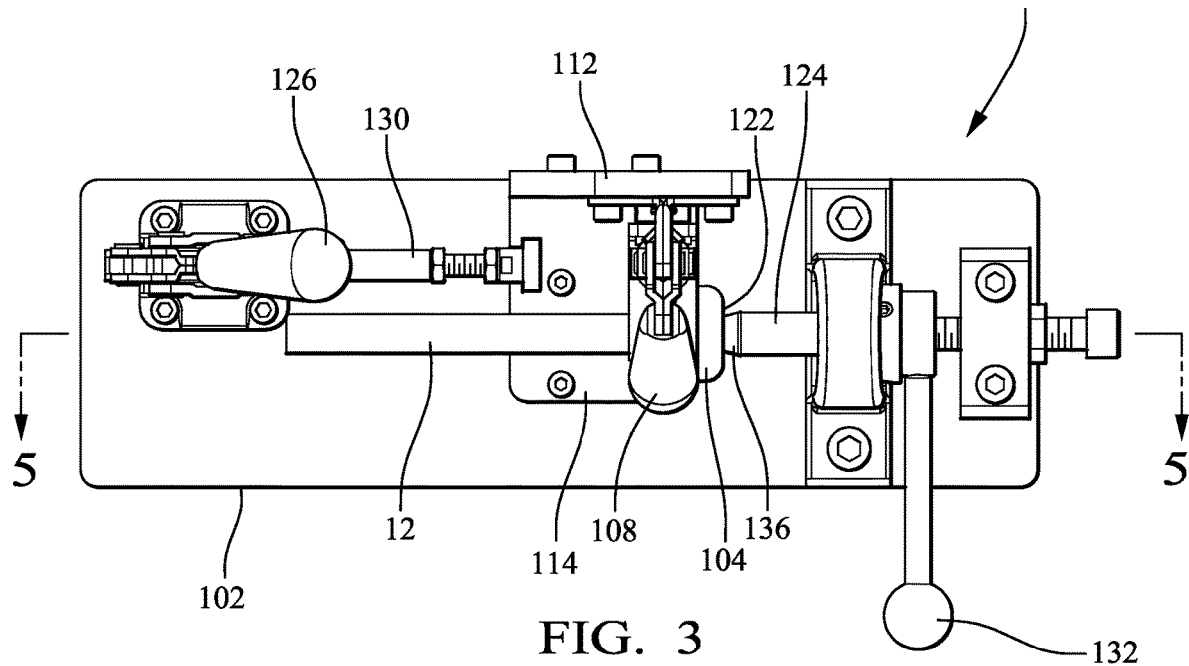
FIG. 3 shows a top view of the apparatus of FIG. 1 according to an embodiment.
Figure 4:
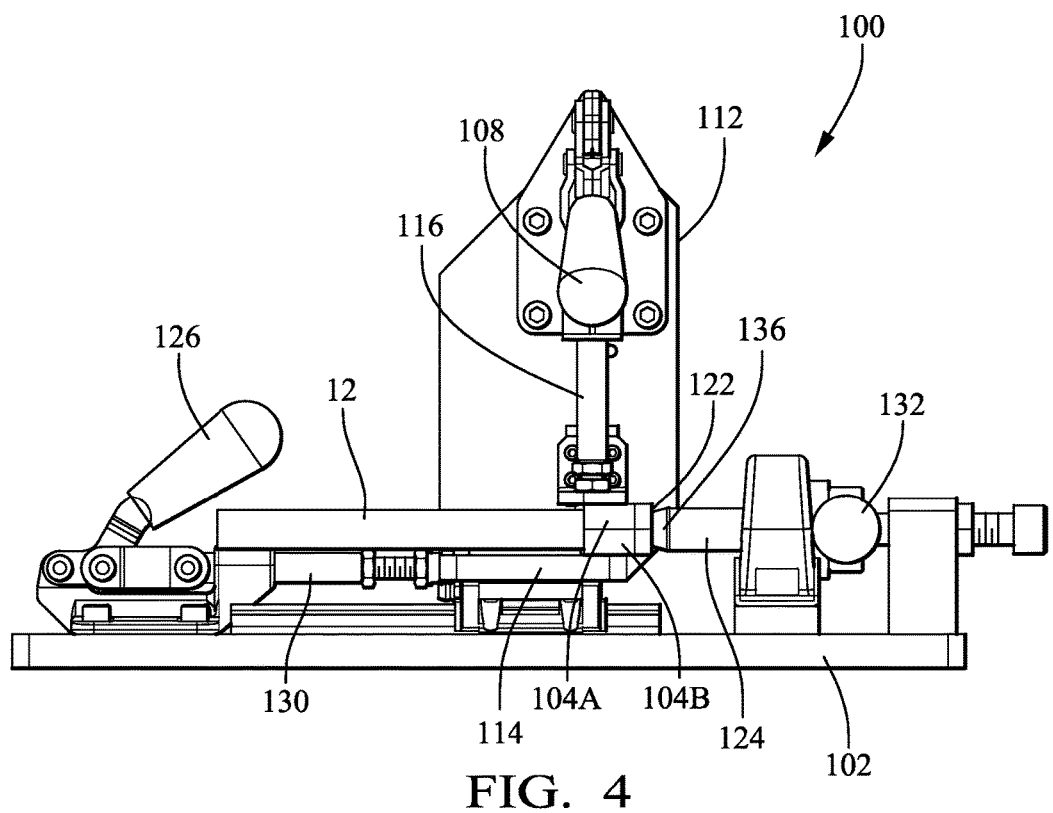
FIG. 4 shows a side view of the apparatus of FIG. 1 according to an embodiment.
Figure 5:
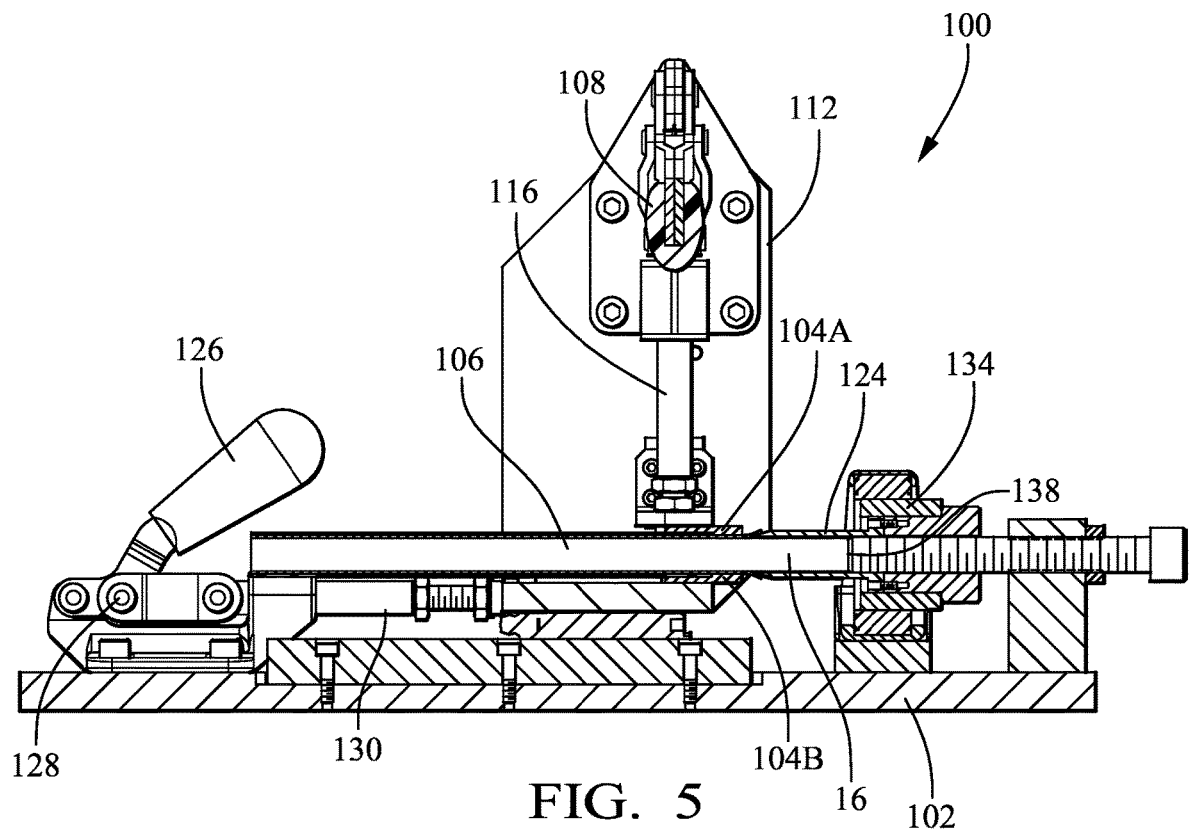
FIG. 5 shows a cross-section side view of the apparatus of FIG. 1 along section line A-A of FIG. 5 according to an embodiment.
Figure 6:
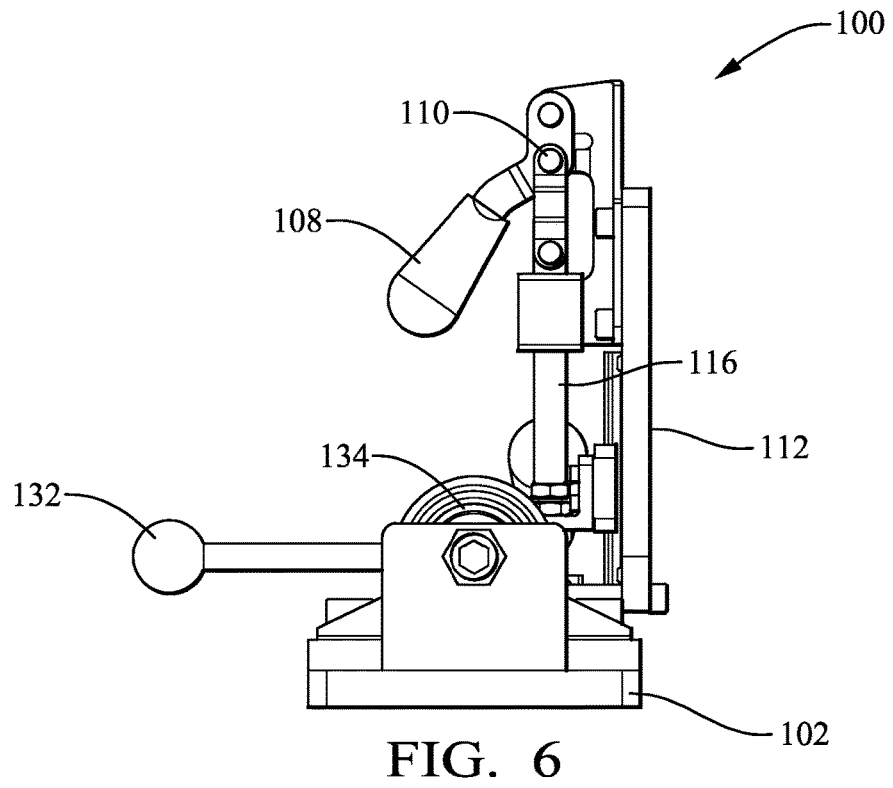
FIG. 6 shows a top view of the apparatus of FIG. 1 according to an embodiment.

As best shown in FIGS. 2 and 4, the shielded electrical cable 12 is placed in the aperture 106 of the clamping die 104 so that the previously flared shield conductor 10 is proximate a side surface of the clamping die that serves as a cutting surface 122.

The apparatus 100 further includes a die translation mechanism that is configured to move the clamping die 104 in a direction parallel to a longitudinal axis X of the shielded electrical cable, hereafter referred to as the longitudinal direction X. This longitudinal movement is configured to move the clamping die 104 and the shielded electrical cable 12 retained within it relative to a cutting tube 124 that is configured to remove a portion of a free end 14 of the flared shield conductor 10. In the illustrated example, the die translation mechanism includes a second lever 126 connected by a second pivot 128 to the base plate 102. The second lever 126 is also attached to the sliding plate 114 by a second connecting rod 130. The second lever 126 is configured to longitudinally move the sliding plate 114 and thereby the clamping die 104 relative to the cutting tube 124 as shown by comparing FIGS. 1 and 2.

The cutting tube 124 is a hollow tube that is configured to receive an end 16 of the shielded electrical cable 12. The cutting surface 122 is pressed against the cutting tube 124 by the die translation mechanism while the flared shield conductor 10 is disposed between the cutting surface 122 and the cutting tube 124. The cutting tube 124 is then rotated while the cutting surface 122 is pressed against the cutting tube 124, thereby cutting a portion of the free end 14 of the flared shield conductor 10 and trimming the shield conductor 10 to the desired length for further processing, such as attachment of a connector or ferrule (not shown). The cutting surface 122 may be characterized as having an annular shape. The apparatus 100 also contains a cutting tube rotation mechanism that is configured to rotate the cutting tube 124 around the longitudinal axis X of the shielded electrical cable 12 while it is in contact with the cutting surface 122. The cutting tube rotation mechanism includes a third lever 132 connected to the cutting tube 124. The cutting tube rotation mechanism further includes a bearing 134 through which the cutting tube 124 is secured to the base plate 102 and allows the cutting tube 124 to rotate about the longitudinal axis of the shielded electrical cable 12. The cutting tube 124 further comprises a frustoconical guiding tool 136 configured to position the flared shield conductor 12 between with the cutting surface 122 and the cutting tube 124.

The apparatus 100 additionally includes a cable stop 138 that is configured to contact the end 16 of the shielded electrical cable 12, thereby positioning the flared shield conductor 12 relative to the cutting surface 122 and the cutting tube 124.

Figure 7:
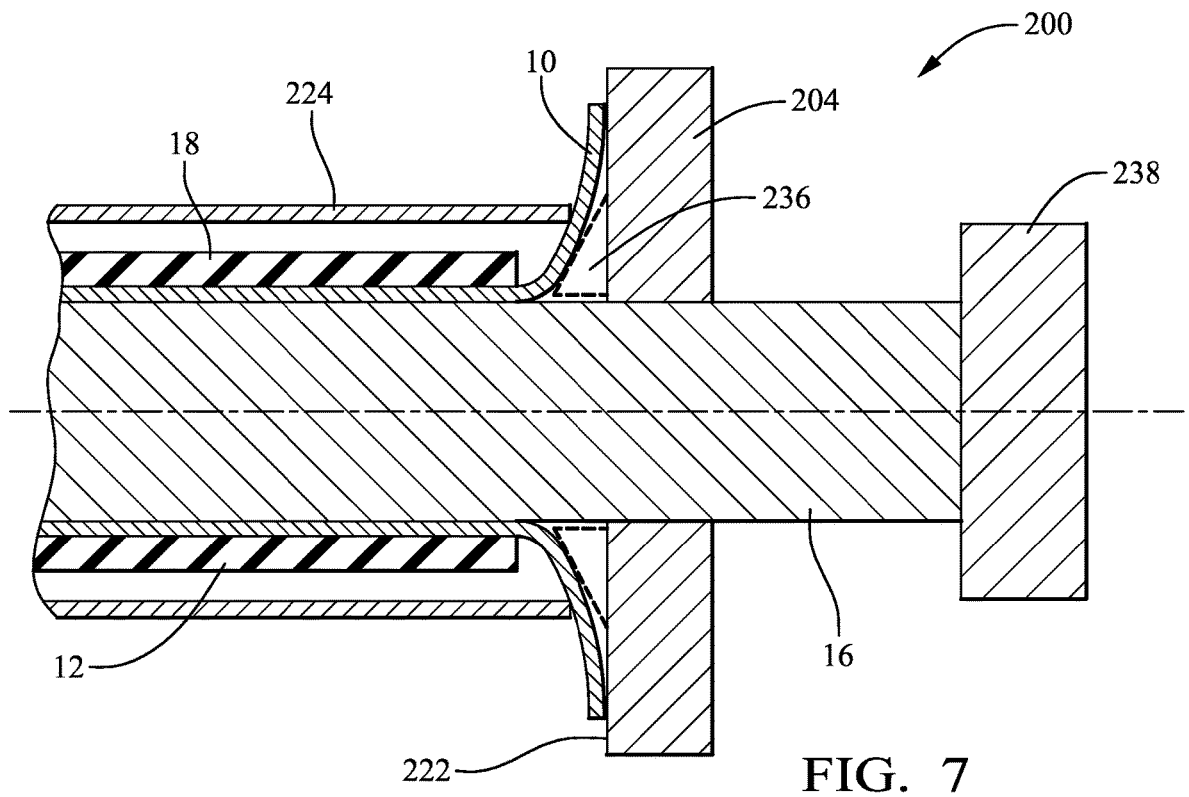
FIG. 7 shows a schematic side view of an arrangement of a cutting surface and cutting tube according to another embodiment.
Figure 8:
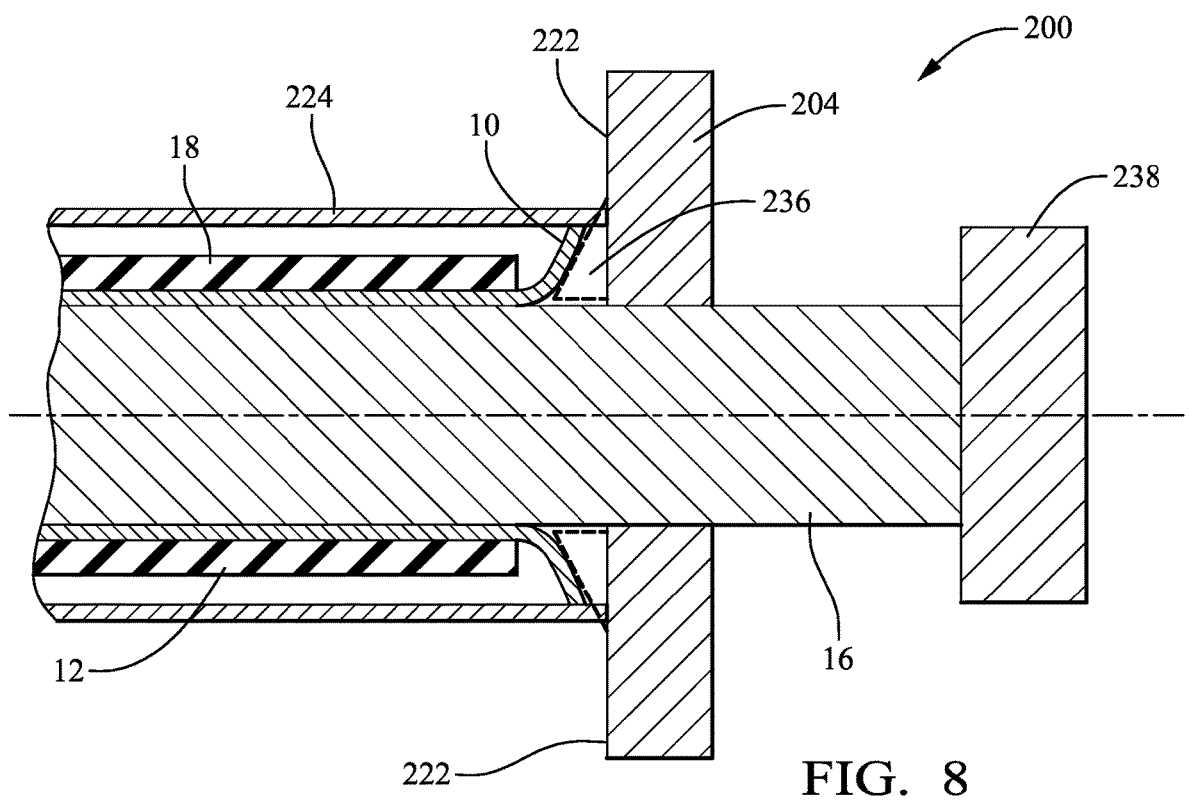
FIG. 8 shows a schematic side view of an arrangement of the shield conductor and the cutting surface in the apparatus of FIG. 7 after cutting according to the other embodiment.
Figure 9:
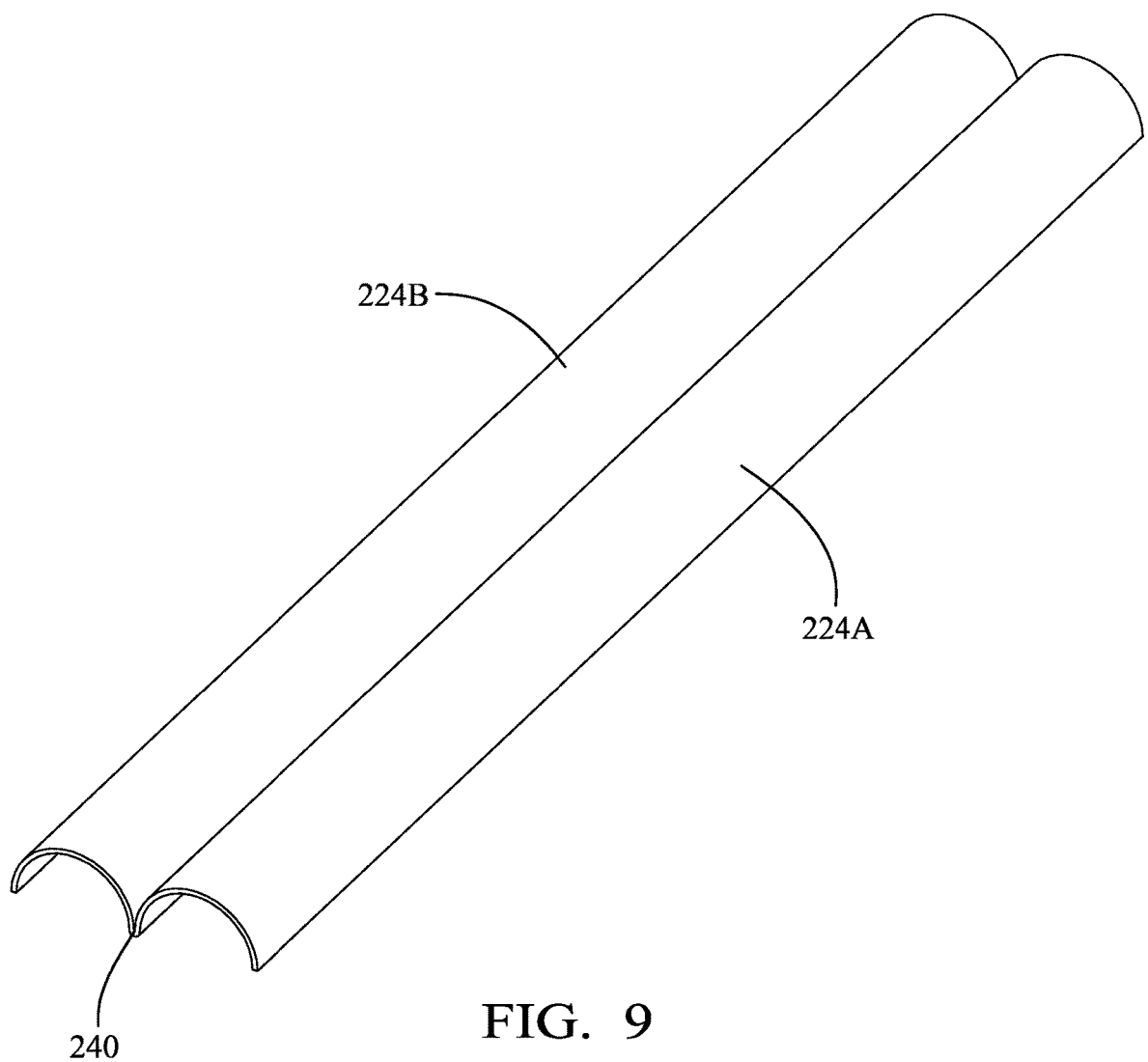
FIG. 9 shows a perspective view of a hinged cutting tube of the apparatus of FIG. 7 after cutting according to the other embodiment.

Another non-limiting example of an apparatus 200 for cutting a shield conductor similar to the apparatus 100 is shown in FIGS. 7-9. This apparatus includes a two-piece clamshell-style cutting tube 224 (instead of the hollow one-piece cutting tube 124) that can be opened and closed around a stationary high voltage shielded electrical cable 12 (instead of requiring the cable to be inserted into the cutting tube 124). The cutting tube 224 may include two semi-cylindrical halves 224A, 224B that are joined by a hinge 240 along a longitudinal seam as shown in FIG. 9. The die 204 further comprises a frustoconical guiding tool 236 configured to position the flared shield conductor 12 between with the cutting surface 222 and the cutting tube 224. The cutting tube 224 is located on the opposite side of a die 204 defining a cutting surface 222 compared to apparatus 100, thereby eliminating the need for the operator to reach past the die 204 and thus improving operator ergonomics and safety.

The apparatus 200 additionally includes a cable stop 238 that is configured to contact the end 16 of the shielded electrical cable 12, thereby positioning the flared shield conductor 12 relative to the cutting surface 222 and the cutting tube 224.

Figure 10:
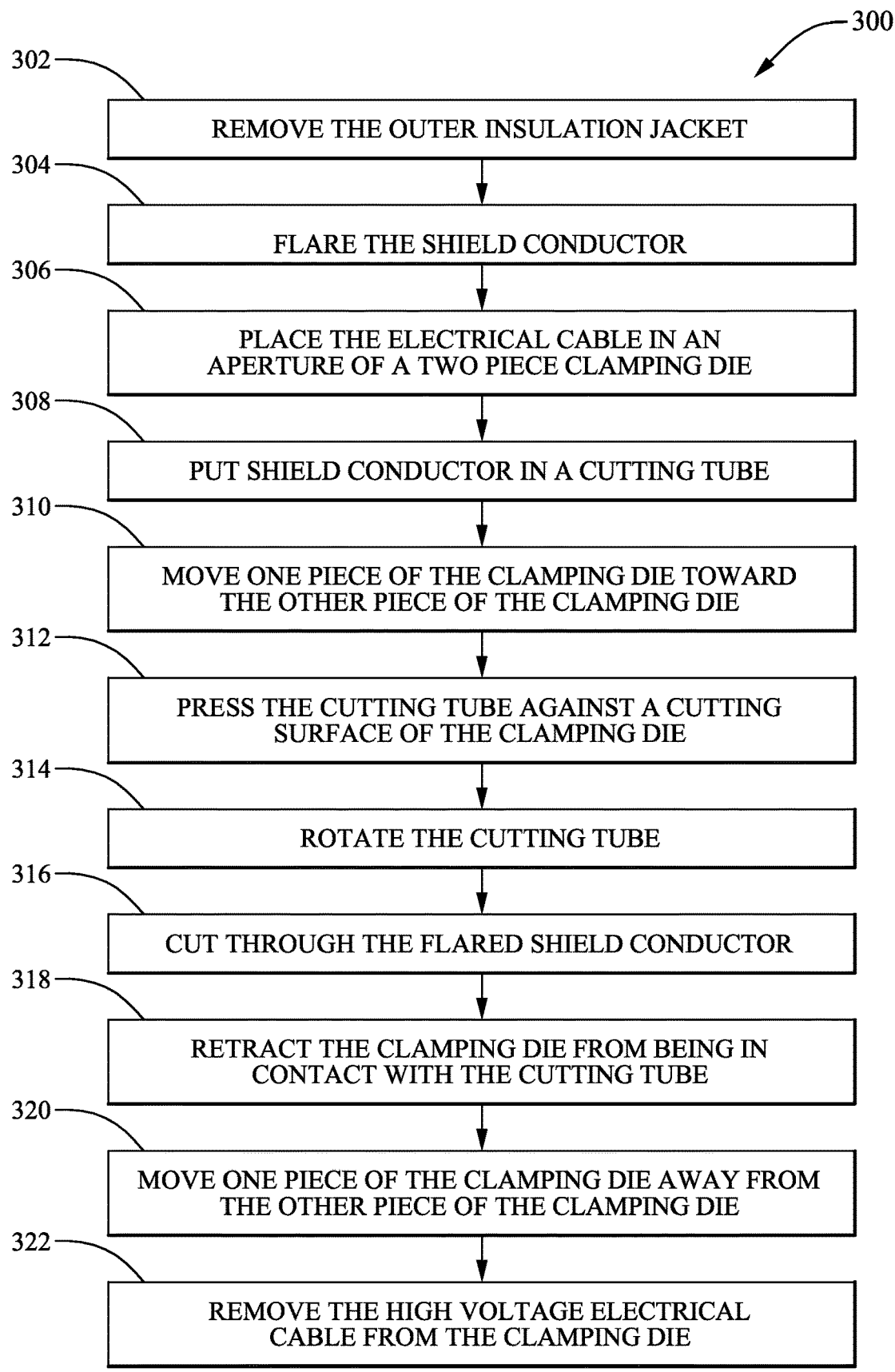
FIG. 10 shows a flow chart of a method of cutting a shield conductor of a shielded electrical cable using the apparatus of FIG. 1.

A method 300 of cutting the shield conductor of a high voltage shielded electrical cable illustrated in FIG. 10 includes the following steps:

STEP 302, REMOVE THE OUTER INSULATION JACKET, includes removing a portion of the outer insulating jacket 18 of the high voltage shielded electrical cable 12 to expose the shield conductor 10. STEP 302 may be performed manually or automatically using an insulation stripping tool;

STEP 304, FLARE THE SHIELD CONDUCTOR, includes flaring the wires of the braided shield conductor 10 outwardly from the high voltage shielded electrical cable 12. STEP 304 may be performed manually by a human operator or semi-automatically using a flaring tool;

STEP 306, PLACE THE ELECTRICAL CABLE IN AN APERTURE OF A TWO-PIECE CLAMPING DIE, includes placing the shielded electrical cable 12 in an aperture 106 of a two-piece clamping die 104;

STEP 308, MOVE PIECE OF THE CLAMPING DIE TOWARD THE OTHER PIECE OF THE CLAMPING DIE, includes moving at least one of the two pieces 104A of the clamping die 104 toward the other of the two pieces 104B of the clamping die 104 in a lateral direction Y perpendicular to the longitudinal axis X of the shielded electrical cable 12, thereby clamping the shielded electrical cable 12 within the aperture 106 of the clamping die 104;

STEP 310, PRESS THE CUTTING TUBE AGAINST A CUTTING SURFACE OF THE CLAMPING DIE, includes pressing the cutting tube 124 against a cutting surface 122 of the clamping die 104 with the flared shield conductor 12 disposed between the cutting tube 124 and the cutting surface 122;

STEP 312, ROTATE THE CUTTING TUBE, includes rotating the cutting tube 124 relative to the cutting surface 122 of the clamping die 104;

STEP 314, CUT THROUGH THE FLARED SHIELD CONDUCTOR WITH AN EDGE OF THE CUTTING TUBE AS IT IS PRESSED AGAINST THE CUTTING SURFACE, includes cutting through the flared shield conductor 12 with an edge of the cutting tube 124 as it is pressed and rotated against the cutting surface 122;

STEP 316, RETRACT THE CLAMPING DIE FROM BEING IN CONTACT WITH THE CUTTING TUBE, includes retracting the clamping die 104 from being in contact with the cutting tube 124;

STEP 318, MOVE ONE PIECE OF THE CLAMPING DIE AWAY FROM THE OTHER PIECE OF THE CLAMPING DIE, includes moving the at least one of the two pieces 104A of the clamping die 104 away from the other of the two pieces 104B of the clamping die 104 in the lateral direction Y, thereby releasing the shielded electrical cable 12 from the aperture 106 of the clamping die 104; and STEP 320, REMOVE THE HIGH VOLTAGE ELECTRICAL CABLE FROM THE CLAMPING DIE, includes removing the high voltage shielded electrical cable 12 from the clamping die 104 and thereby from the apparatus 100.

While the illustrated embodiments have been directed to high voltage shielded electrical cables, this apparatus and method may also be used with other shielded electrical cables, for example coaxial cables used to carry radio frequency or high frequency data signals.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An apparatus configured to cut a shield conductor of a shielded electrical cable that is flared outwardly from the shielded electrical cable, the apparatus comprising:
    a two-piece clamping die comprising an aperture extending therethrough in which the shielded electrical cable is secured, a side surface of the clamping die serving as a cutting surface, the two pieces of the clamping die being configured to be opened and closed around the shielded electrical cable;
    a cutting tube configured to receive an end of the shielded electrical cable and to press against the cutting surface of the clamping die while the flared shield conductor is disposed between an edge of the cutting tube and the cutting surface of the clamping die, thereby cutting a portion of a free end of the flared shield conductor; and
    a cutting tube rotation mechanism connected to a lever configured to rotate the cutting tube around a longitudinal axis of the shielded electrical cable.

2. The apparatus in accordance with claim 1, further comprising a die clamping mechanism configured to move at least one of the two pieces of the clamping die relative to the other of the two pieces of the clamping die in a direction perpendicular to a longitudinal axis of the shielded electrical cable.

3. The apparatus in accordance with claim 1, further comprising a die translation mechanism configured to move the clamping die in a direction parallel to a longitudinal axis of the shielded electrical cable relative to the cutting tube.

4. The apparatus in accordance with claim 1, further comprising a cable stop configured to contact the end of the shielded electrical cable, thereby positioning the flared shield conductor relative to the cutting tube and cutting surface of the clamping die.

5. The apparatus in accordance with claim 1, wherein the side surface of the clamping die defines an annular shape.

6. The apparatus in accordance with claim 1, wherein the cutting tube further comprises a frustoconical guiding tool configured to position the flared shield conductor between the cutting surface of the clamping die and the cutting tube.

7. A method of cutting a shield conductor of a high voltage shielded electrical cable, comprising:
    flaring a free end of the shield conductor outwardly from the high voltage shielded electrical cable;
    placing the shielded electrical cable in an aperture of a two-piece clamping die, a side surface of the clamping die serving as a cutting surface;
    moving at least one of the two pieces of the clamping die toward the other of the two pieces of the clamping die in a direction perpendicular to a longitudinal axis of the shielded electrical cable, thereby clamping the shielded electrical cable within the aperture of the clamping die;
    disposing an end of the shielded electrical cable within a cutting tube;
    moving the clamping die in a direction parallel to a longitudinal axis of the shielded electrical cable towards the cutting tube;
    pressing the cutting tube against a cutting surface of the clamping die with the flared shield conductor disposed between the cutting tube and the cutting surface;
    rotating the cutting tube relative to the cutting surface of the clamping die; and
    cutting through the flared shield conductor with an edge of the cutting tube as it is pressed against the cutting surface of the clamping die.

8. The method in accordance with claim 7, wherein the step of flaring the free end of the shield conductor outwardly from the high voltage shielded electrical cable is performed prior to all of the other steps of the method.

9. The method in accordance with claim 7, further comprising:
retracting the clamping die from being in contact with the cutting tube;
moving the at least one of the two pieces of the clamping die away from the other of the two pieces of the clamping die in a direction perpendicular to a longitudinal axis of the shielded electrical cable, thereby releasing the shielded electrical cable from the aperture of the clamping die; and
removing the high voltage shielded electrical cable from the clamping die.

10. The method in accordance with claim 7, wherein the steps of moving at least one of the two pieces of the clamping die toward the other of the two pieces of the clamping die in a direction perpendicular to a longitudinal axis of the shielded electrical cable and moving the at least one of the two pieces of the clamping die away from the other of the two pieces of the clamping die in a direction perpendicular to a longitudinal axis of the shielded electrical cable are performed using a linear actuator having a lever configured to rotate about a pivot and a connecting rod attached between the lever and the at least one of the two pieces of the clamping die.

11. The method in accordance with claim 7, wherein the steps of moving the clamping die in a direction parallel to a longitudinal axis of the shielded electrical cable towards the cutting tube and moving the at least one of the two pieces of the clamping die away from the other of the two pieces of the clamping die in a direction perpendicular to a longitudinal axis of the shielded electrical cable are performed using a linear actuator having a lever configured to rotate about a pivot and a connecting rod attached between the lever and the at least one of the two pieces of the clamping die.

12. The method in accordance with claim 11, wherein the linear actuator further comprises a guide rail.

13. The method in accordance with claim 7, wherein the step of rotating the cutting tube relative to the cutting surface of the clamping die is performed using a lever attached to the cutting tube.

14. The method in accordance with claim 7, further comprising:
removing a portion of an outer insulating jacket of the high voltage shielded electrical cable to expose the shield conductor.

15. An apparatus configured to cut a shield conductor of a shielded electrical cable that is flared outwardly from the shielded electrical cable, said apparatus comprising:
a die comprising a cutting surface on a side of the die and an aperture extending therethrough, the aperture being configured to receive an end of the shielded electrical cable;
a cutting tube having two parts that are configured to be closed around the shielded electrical cable and pressed against the cutting surface while the flared shield conductor is disposed between the cutting tube and the cutting surface on the side of the die, thereby cutting a portion of a free end of the flared shield conductor; and
a cutting tube rotation mechanism connected to a lever configured to rotate the cutting tube around a longitudinal axis of the shielded electrical cable.

16. The apparatus in accordance with claim 15, further comprising a cable stop configured to contact the end of the shielded electrical cable, thereby positioning the flared shield conductor relative to the cutting tube and cutting surface on the side of the die, wherein the side surface of the clamping die defines an annular shape.

17. The apparatus in accordance with claim 15, wherein the apparatus further comprises a frustoconical guiding tool surrounding the aperture configured to guide the flared shield conductor into contact with the cutting surface on the side of the die.

18. The apparatus in accordance with claim 15, wherein the two parts of the cutting tube each have a semi-cylindrical shape and are joined along a longitudinal edge by a hinge feature, thereby forming a cylindrical cutting tube when closed about the shielded electrical cable.

19. The apparatus in accordance with claim 15, wherein a diameter of the aperture is greater than a diameter of the flared shield conductor.

\* \* \* \* \*